US011036293B2

(12) United States Patent
Penmatcha et al.

(10) Patent No.: US 11,036,293 B2
(45) Date of Patent: Jun. 15, 2021

(54) METHOD FOR USING FINGERS TO INTERACT WITH A SMART GLOVE WORN ON A HAND

(71) Applicant: Flex Ltd., Singapore (SG)

(72) Inventors: Mukul Varma Penmatcha, Milpitas, CA (US); Mesut Gorkem Eraslan, San Jose, CA (US)

(73) Assignee: Flex Ltd., Singapore (SG)

( * ) Notice: Subject to any disclaimer, the term of this patent is extended or adjusted under 35 U.S.C. 154(b) by 0 days.

(21) Appl. No.: 16/213,538

(22) Filed: Dec. 7, 2018

(65) Prior Publication Data

US 2019/0179412 A1 Jun. 13, 2019

Related U.S. Application Data

(60) Provisional application No. 62/693,774, filed on Jul. 3, 2018, provisional application No. 62/595,931, filed on Dec. 7, 2017.

(51) Int. Cl.
*G06F 3/01* (2006.01)
*G06F 3/0346* (2013.01)

(52) U.S. Cl.
CPC ............ *G06F 3/014* (2013.01); *G06F 3/0346* (2013.01)

(58) Field of Classification Search
CPC ................................. G06F 3/014; G06F 3/0346
See application file for complete search history.

(56) References Cited

U.S. PATENT DOCUMENTS

| 9,387,112 | B2* | 7/2016 | Bryant | A61F 5/013 |
|---|---|---|---|---|
| 9,389,684 | B2* | 7/2016 | Sebastian | G06F 3/014 |
| 9,636,270 | B2* | 5/2017 | Miyazawa | A61F 2/586 |
| 10,642,318 | B1* | 5/2020 | Lehmann | G06F 1/1681 |
| 2002/0155925 | A1* | 10/2002 | Smith | A63B 21/002 482/4 |
| 2003/0011567 | A1* | 1/2003 | Villet | G06F 3/0481 345/157 |
| 2008/0189827 | A1* | 8/2008 | Bauer | A61B 5/225 2/161.2 |
| 2009/0222973 | A1* | 9/2009 | Merkle | A41D 19/0027 2/161.6 |
| 2010/0041521 | A1* | 2/2010 | Ingvast | A61H 1/0288 482/49 |
| 2010/0328205 | A1* | 12/2010 | Cheng | G06F 3/014 345/157 |
| 2011/0132181 | A1* | 6/2011 | Kockovic | G10H 1/34 84/723 |
| 2011/0302694 | A1* | 12/2011 | Wang | A61B 5/103 2/160 |

(Continued)

*Primary Examiner* — Sejoon Ahn
(74) *Attorney, Agent, or Firm* — Sheridan Ross P.C.

(57) ABSTRACT

Smart gloves and methods for using smart gloves are provided. In embodiments of the disclosure, gloves are integrated with a display and controls in such a way as to allow a user to access and/or manipulate the controls using the same hand on which the user wears the glove. A user can thus access and/or control the glove and the content or information embodied therein while also accomplishing other tasks with his or her hands. Embodiments also comprise touch- and/or force-sensitive sensors, e.g. resistive or capacitive sensors, integrated into the glove that the user can access and/or manipulate with one or more fingers, preferably the thumb, of the hand on which the user wears the glove.

20 Claims, 9 Drawing Sheets

(56) References Cited

U.S. PATENT DOCUMENTS

| | | | |
|---|---|---|---|
| 2013/0204435 A1* | 8/2013 | Moon | G06F 17/00 700/258 |
| 2013/0219585 A1* | 8/2013 | Bergelin | B25J 9/0006 2/160 |
| 2013/0219586 A1* | 8/2013 | Ihrke | B25J 15/02 2/160 |
| 2014/0134575 A1* | 5/2014 | Kim | G09B 21/025 434/114 |
| 2015/0290795 A1* | 10/2015 | Oleynik | B25J 9/0081 700/257 |
| 2019/0171302 A1* | 6/2019 | Su | G06F 1/3215 |

* cited by examiner

METHOD FOR USING FINGERS TO INTERACT WITH A SMART GLOVE WORN ON A HAND

CROSS REFERENCE TO RELATED APPLICATION

The present application claims the benefits of U.S. Provisional Application Ser. No. 62/595,931, filed Dec. 7, 2017, and 62/693,774, filed Jul. 3, 2018, both of which are entitled "METHOD TO USE FINGERS TO INTERACT WITH A SMART GLOVE WORN ON THAT HAND" and each of which is incorporated herein by this reference in its entirety.

FIELD

Embodiments of the present disclosure relate generally to methods and systems for smart gloves, and more particularly to functionality that allows a user to use the fingers of his or her hand to interact with a smart glove worn on the same hand.

BACKGROUND

Wearable computers, also known as wearables, are small computing devices that are worn under, with, or on top of clothing, and include but are not limited to smartphones and smartwatches. Wearables may be general-purpose computers, or they may be specialized for use as, by way of non-limiting example, fitness trackers. Wearables may incorporate special sensors, including but not limited to accelerometers, thermometers, and/or heart rate monitors, and may be worn or placed on any suitable part of the body by any suitable means, including but not limited to around the wrist, hung from the neck, strapped to an arm or leg, on the head, on a finger, or in a shoe. More modern wearables generally provide a user with the ability to control other wirelessly connected physical devices, including but not limited to vehicles, home appliances, and other devices commonly considered to be part of the Internet of Things (IoT), by interacting with, manipulating, and/or inputting commands to the wearable, which then communicates accordingly with the desired wirelessly connected physical device.

Despite their many advantages, one drawback of smartphones and smartwatches is that, in general, they require the user to have at least one hand free to access and/or interact with information provided by the smartphone or smartwatch. By way of non-limiting example, while some smartphones enable the user to access information or input instructions via voice commands, the range of information and commands that are voice-enabled, and the device's ability to convey desired information and/or carry out a task, is necessarily limited by the accuracy of voice recognition technology, and in any event usually does not extend to cover the full range of functions of the device. Smartwatches are even more likely to require a user to have the opposite hand (i.e., the right hand when the watch is worn on the left wrist, or vice versa) free to interact with the device.

Some previous efforts to overcome these drawbacks have resulted in the creation of so-called smart gloves, in which a display is integrated into a glove worn on the hand to display information to a user. Unfortunately, these previous efforts have generally had limited success in addressing the problems inherent to smartphones and smartwatches; the user of a smart glove is generally limited in how he or she can interact with the device, and many concepts either require the other hand to access certain features or have relatively few input controls and are therefore difficult or cumbersome to use.

There is thus a need in the art for smart devices, and particularly wearables, that can be worn on the hand, provide a full range of functionality, and allow the user to control content and/or input instructions using the same hand, preferably as little as a single finger of the same hand, on which the device is worn.

SUMMARY

It is one aspect of the present disclosure to provide a method for controlling and interacting with a wearable computer worn on a hand, comprising triggering, by a first finger of the hand, a sensor of the wearable computer, wherein the sensor is disposed on a palmar aspect of a first portion of a glove, wherein the first portion of the glove is disposed on at least one of a second finger of the hand and a palm of the hand, wherein the first and second fingers of the hand are not the same finger.

In embodiments, the sensor may be at least one of force-sensitive and touch-sensitive. The sensor may, but need not, be at least one of capacitive and resistive.

In embodiments, the sensor may comprise a feedback mechanism, wherein the feedback mechanism provides a perceptible feedback to a user when the sensor is triggered. The feedback may, but need not, be at least one of an auditory feedback and a haptic feedback.

In embodiments, the method may further comprise communicating, by the wearable computer and, as a result of the triggering step, a command to a device that is in wireless communication with the wearable computer.

In embodiments, the wearable computer may comprise at least one additional component disposed on a second portion of the glove, wherein the at least one additional component is selected from the group consisting of a display and a battery. The at least one additional component may, but need not, be flexible, and the second portion of the glove may, but need not, be disposed on a wrist of the hand.

In embodiments, the wearable computer may comprise at least one of a GPS receiver and an accelerometer.

It is another aspect of the present disclosure to provide a wearable computing device adapted to be worn on a hand, comprising a glove; and at least one sensor, adapted to be triggerable by a first finger of the hand and disposed on a palmar aspect of a first portion of the glove, wherein the first portion of the glove is disposed on at least one of a second finger of the hand and a palm of the hand, wherein the first and second fingers of the hand are not the same finger.

In embodiments, the at least one sensor may be at least one of force-sensitive and touch-sensitive. The at least one sensor may, but need not, be at least one of capacitive and resistive.

In embodiments, the at least one sensor may comprise a feedback mechanism, wherein the feedback mechanism provides a perceptible feedback to a user when the at least one sensor is triggered. The feedback may, but need not, be at least one of an auditory feedback and a haptic feedback.

In embodiments, the wearable computing device may be adapted to communicate a command to a device that is in wireless communication with the wearable computing device when the at least one sensor is triggered.

In embodiments, the wearable computing device may comprise at least one additional component disposed on a second portion of the glove, wherein the at least one additional component is selected from the group consisting of a display and a battery. The at least one additional component may, but need not, be flexible, and the second portion of the glove may, but need not, be disposed on a wrist of the hand.

In embodiments, the wearable computing device may further comprise at least one of a GPS receiver and an accelerometer.

It is another aspect of the present disclosure to provide a method of operation of a wearable computer worn on a hand, comprising a) receiving, by a sensor communication interface of the wearable computer, at least one sensor input from at least one sensor, wherein the sensor is associated with a corresponding digit of a user and the sensor input is associated with a user command to perform a selected operation; b) executing, by a processor of the wearable computer, at least one of a communication instruction set and a sensor input processing instruction set to process the sensor input; c) executing, by the processor, a display control instruction set to determine if the user command is associated with or temporally related to more than one sensor input; d) mapping, by the processor, at least one of the duration of each sensor input, the magnitude of each sensor input, a unique sensor identifier, a sensor input sequence, and a sensor input frequency to determine the user command; and e) executing, by the processor, the determined user command to cause a display to display information corresponding to the determined user command.

In embodiments, step b) may comprise the sub-step of b1) executing, by the processor, a sensor and digit mapping instruction set to map the source sensor to the corresponding digit of the user. After step c), the processor may, but need not, repeat sub-step b1) with respect to each sensor input if the user command is associated with or temporally related to more than one sensor input.

In embodiments, the sensor may be at least one of force-sensitive and touch-sensitive.

In embodiments, the sensor may comprise a feedback mechanism, wherein the feedback mechanism provides a perceptible feedback to the user when the sensor communication interface receives the sensor input from the sensor.

In embodiments, the method may further comprise f) communicating, by the wearable computer and to a device that is in wireless communication with the wearable computer, a device command corresponding to the determined user command.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Embodiments of the disclosure provide systems and methods for smart gloves. Generally speaking, embodiments described herein provide gloves integrated with a display and controls that a user may access and/or manipulate by using the same hand on which the user wears the glove. A user can thus access and/or control the glove and the content or information embodied therein while also accomplishing other tasks with his or her hands. More specifically, embodiments comprise touch- and/or force-sensitive sensors, e.g. resistive or capacitive sensors, integrated into the glove that the user can access and/or manipulate with one or more fingers, preferably the thumb, of the hand on which the user wears the glove.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
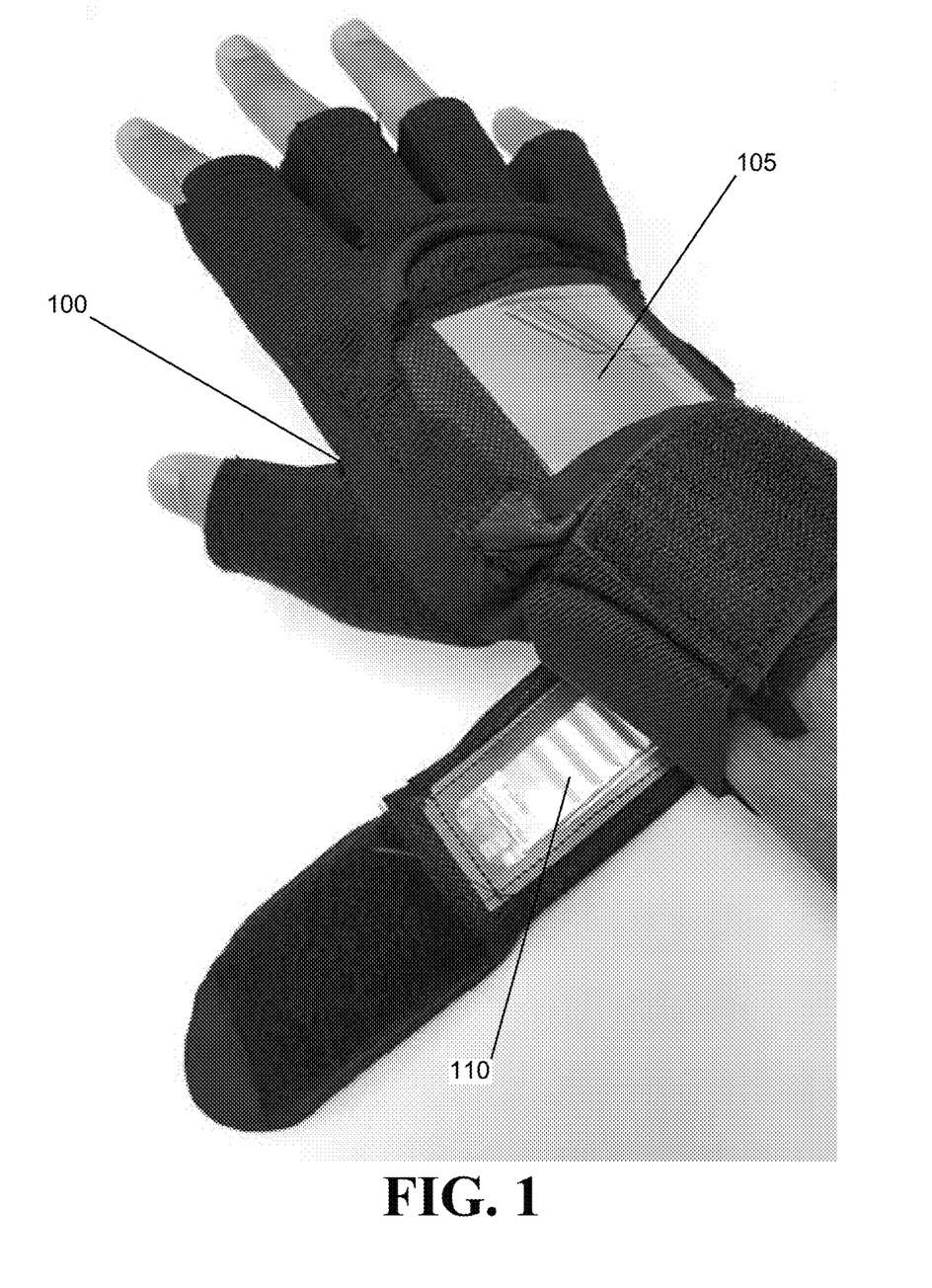
FIG. 1 is an illustration of a dorsal aspect of a smart glove, according to embodiments of the present disclosure.

Referring now to FIG. 1, a smart glove 100 according to embodiments of the present disclosure comprises a display 105 and a battery 110. Each of the display 105 and the battery 110 may be either flexible or rigid. Types of rigid and flexible technologies suitable for use in the display 105 of the present disclosure include, but are not limited to, liquid crystal displays (LCDs), organic light-emitting diodes (OLEDs), electronic paper, and the like. In a preferred embodiment, as illustrated in FIG. 1, the display 105 is disposed on a portion of the dorsal aspect of the glove associated with the opisthenar of the user's hand, and the battery 110 is disposed on or within a portion of the glove associated with the wrist of the user's hand. FIG. 1 also illustrates various optional features of the smart glove 100; by way of non-limiting example, in the embodiment illustrated in FIG. 1, the smart glove 100 comprises an optional fastener feature, in this case a hook-and-loop fastener feature, to secure the smart glove 100 to the user's hand. The battery 110 may be disposed on or within any suitable portion of the glove, including but not limited to an optional fastener feature, and as a result may be always visible, sometimes visible, or never visible to the user. Likewise, the display 105 may be located on or within any suitable portion of the glove, including on a back of a finger, a wrist, or other visible appendage surface of the user.

Figure 2:
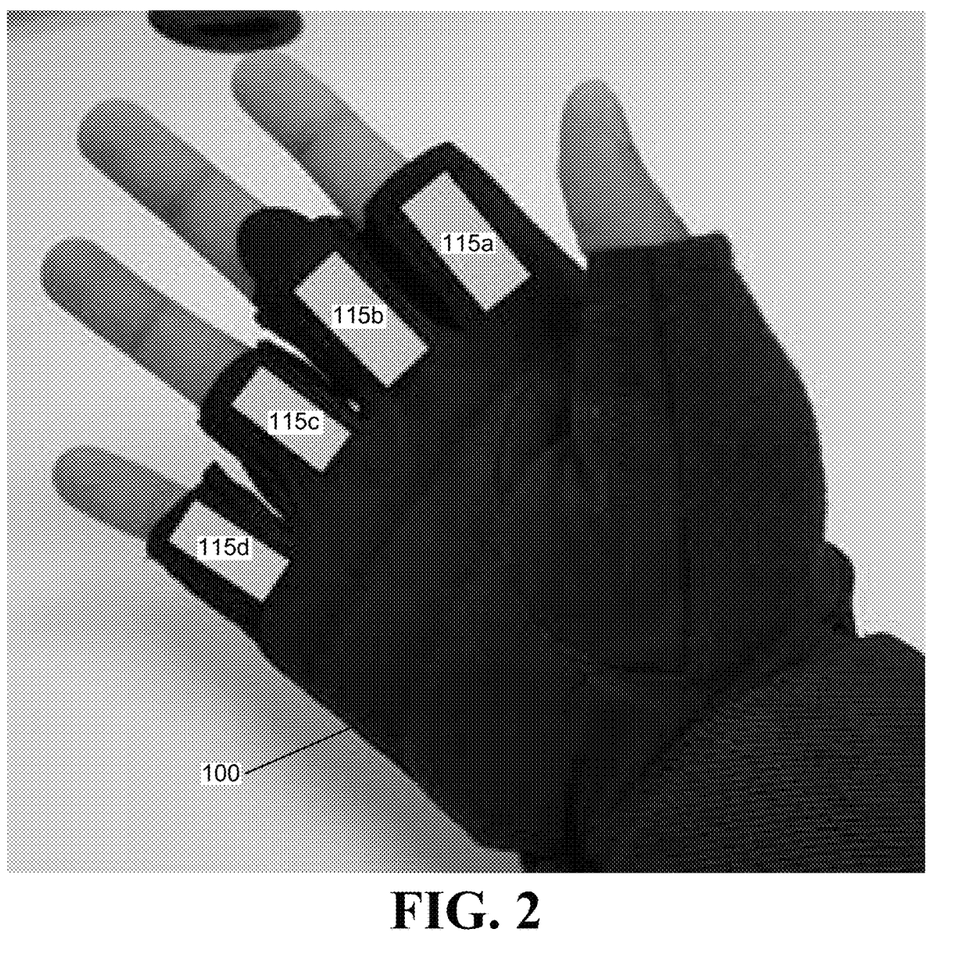
FIG. 2 is an illustration of a palmar aspect of a smart glove, according to embodiments of the present disclosure.

Referring now to FIG. 2, the smart glove 100 comprises one or more flexible, partially flexible, or inflexible sensors 115, disposed on a palmar aspect of the smart glove 100 and operable to control the smart glove 100. In the embodiment illustrated in FIG. 2, the smart glove 100 comprises four sensors 115—an index finger sensor 115a, a middle finger sensor 115b, a ring finger sensor 115c, and a little finger sensor 115d, each sensor disposed between the first and second knuckles of the corresponding finger of the smart glove 100—but it is to be expressly understood that the smart glove 100 of the present disclosure may, in various embodiments, comprise fewer or more sensors and/or sensors disposed on the same or different portions of the palmar aspect of the glove; by way of non-limiting example, the smart glove 100 may additionally or alternatively include a sensor disposed on the palm of the glove, and/or sensors may additionally or alternatively be disposed on a more proximal or more distal portion of the finger of the glove than those portions illustrated. Furthermore, while the sensors 115 of the embodiment illustrated in FIG. 2 are generally rectangular in shape and are clearly visually distinguishable from non-sensor portions of the glove, it is to be expressly understood that in various embodiments, the sensor(s) 115 may have any suitable shape, and may or may not be visually distinguishable from the rest of the glove, e.g. by being a different color (or the same color) as the rest of the glove or by being raised or depressed (or not) relative to a surface of the rest of the glove. The sensor(s) 115 will generally be at least one of force-sensitive and touch-sensitive, and may be capacitive, resistive, both, or neither.

While it is to be understood that smart gloves and other wearable computing devices of the present disclosure may have a wide range of components and features and that these components and features may take any number of configurations and/or orientations, FIGS. 1 and 2 illustrate a combination and configuration of features that may be advantageous for various applications. The fingers of the smart glove 100 may, as illustrated in FIGS. 1 and 2, be open-ended and/or terminate short of the ends of the user's fingers, such that the ends of the user's fingers are exposed and/or protrude outwardly from the smart glove 100; this may enable the user to more easily and reliably access and manipulate the sensors 115 with the exposed and/or protruding portions of his or her fingers, or to simultaneously carry, control, grasp, or hold other devices or objects. The smart glove 100 may, but need not, be at least partially made of a conductive fabric to reduce or eliminate the need for wires connecting any two or more of the display 105, the battery 110, computer or microprocessor (not shown), computer readable medium or memory (not shown), sensor(s) 115, or other components of the smart glove, and to provide greater versatility in the shape and/or size of the smart glove 100 and/or improve the aesthetics of the smart glove 100. Disposing the display 105 and sensor(s) 115 on opposing aspects of the smart glove 100, i.e. the display 105 on the dorsal aspect and the sensor(s) 115 on the palmar aspect, may enable the user to simultaneously view the display 105 and trigger the sensor(s) 115. Additionally, the smart glove 100 may, but need not, comprise a wireless communication capability, such as but not limited to a Bluetooth capability, by which the user may be able to control various wirelessly connected devices (e.g. speakers, headphones, smartphones, smartwatches, vehicles, smart appliances, etc.) by triggering one or more of the sensor(s) 115 of the smart glove 100.

Figure 6:
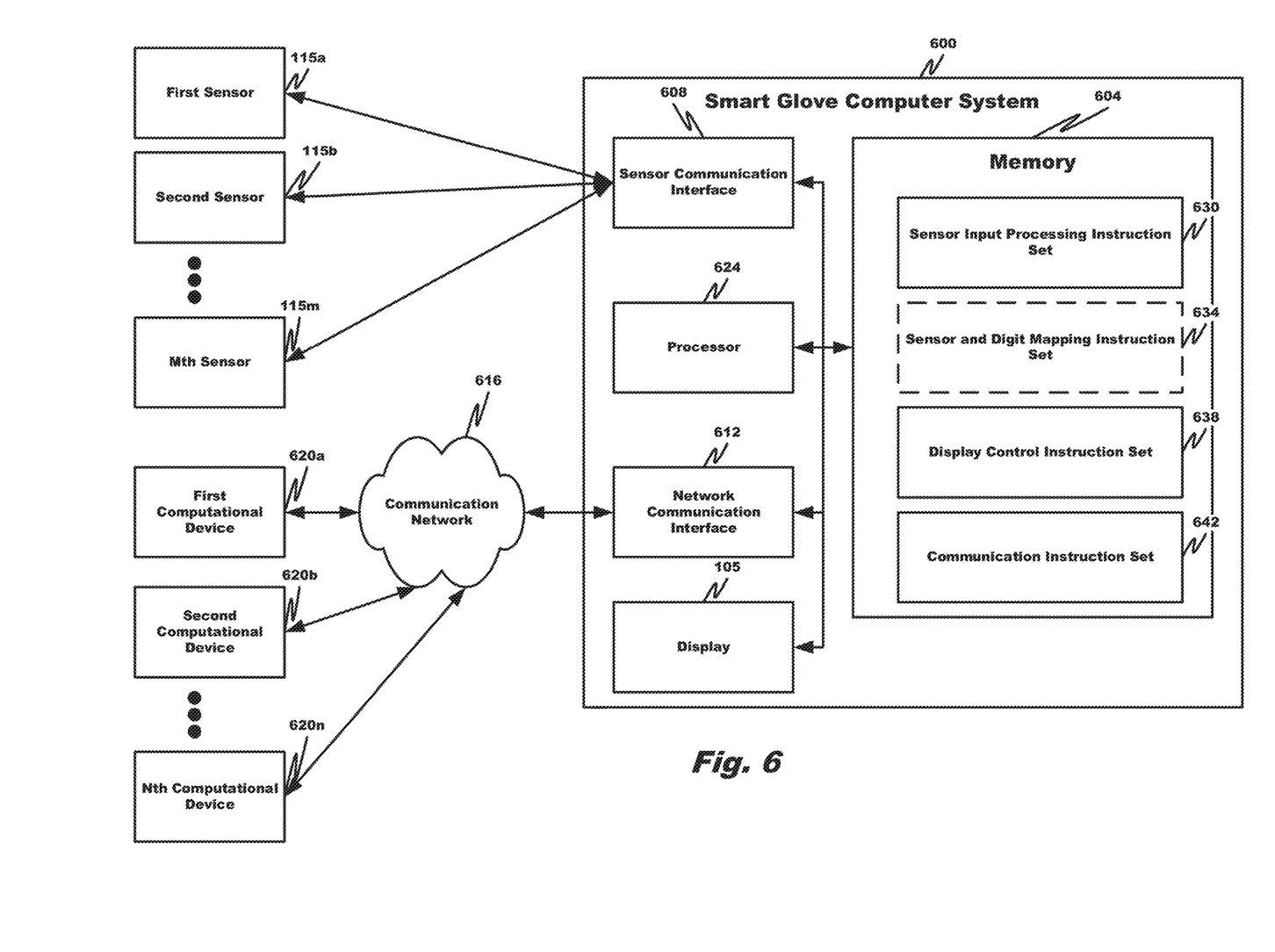
FIG. 6 is a block diagram illustrating elements of the smart glove computer system according to an embodiment of the present disclosure.

With reference initially to FIG. 6, details of an illustrative smart glove computer system 600 will be described in accordance with at least some embodiments of the present disclosure. Generally, the smart glove computer system 600 includes memory 604, sensor communication interface 608, which communicates with the sensors 115a-m, a network communication interface 612 which communicates, via communication network 616, with first, second, . . . nth computational devices 620a-n, the processor 624, and the display 105. The components of the smart glove computer system 600, while depicted as having particular instruction sets and devices, is not necessarily limited to the examples depicted herein. Rather, a system according to embodiments of the present disclosure may include one, some, or all of the components depicted in the system 600 and does not necessarily have to include all of the components in a single device. By way of illustration, the computer or microprocessor 624, computer readable medium or memory 604, display 105, and sensor and network communication interface 608 and 612 may be integrated into a single unit. Alternatively, the various components can be spatially dispersed around the glove. The precise configuration of the various components depends on the application. Generally, the computer, computer readable medium, and display are positioned on the back of the hand to avoid damage from objects gripped by the user.

The memory 604 may include any type of computer memory device or collection of computer memory devices. Non-limiting examples of memory include Random Access Memory (RAM), Read Only Memory (ROM), flash memory, Electronically-Erasable Programmable ROM (EEPROM), Dynamic RAM (DRAM), etc. The memory 604 may be configured to store the instruction sets depicted in addition to temporarily storing data for the processor 624 to execute various types of routines or functions.

The illustrative instruction sets that may be stored in memory 604 include, without limitation, a sensor input processing instruction set 630, a sensor and digit mapping instruction set 634, a display control instruction set 638, and a communication instruction set 642. Functions of the smart glove computer system 600 enabled by these various instruction sets will be described in further detail herein. It should be appreciated that the instruction sets depicted in FIG. 1 may be combined (partially or completely) with other instruction sets or may be further separated into additional and different instruction sets, depending upon configuration preferences for the system 600. Said another way, the particular instruction sets depicted in FIG. 6 should not be construed as limiting embodiments described herein.

The sensor communication interface 608 can be any interface configured to implement the communication protocol of the sensors 115. All communication protocols are implemented differently. Some are full duplex (simultaneous transmit and receive is possible), others are half duplex (transmit and receive must take turns), some are wireless, some use a single wire (i.e. SDI-12), others use four (i.e. RS-422), some stream data constantly (i.e. NMEA), others respond to commands (i.e. SDI-12), some operate at 9600 baud data rates, others operate at 19,200 baud. Different sensors are built with different protocols. When a protocol only defines the hardware, a software protocol must also be selected to complete the communication interface. A common protocol for smart sensors is the Simple Sensor interface (SSI) protocol.

The sensors 115*a-m* can be any suitable sensors for the application. Typically, the sensors 115*a-m* comprise a sensor for each of one or more of the user's digits and may include other sensors depending on the application requirements. The sensor(s) 115 for the user's digits will generally be at least one of force-sensitive and touch-sensitive, and may be capacitive, resistive, both, or neither. Examples of other sensors include a Global Positioning System (GPS) receiver to provide spatial coordinates providing the user's location and geofencing information regarding nearby vendors, a pedometer to count a user's steps, a heart rate monitor to provide a user's heart rate and other sensors to measure a physiological parameter of a user (e.g., body temperature, pulse rate, and the like), a biometric sensor to change a biometric treat of a person into an electrical signal (biometric treats include, for example, biometric fingerprint readers, iris, face, etc.), an accelerometer to measure acceleration of the user's hand, and a gyroscope or angular rate sensors or angular velocity sensors to sense angular velocity of the user's hand.

The communication network 616, via the network communication interface 612, interconnects and facilitates bidirectional machine-to-machine communications between the first, second, . . . nth computational devices 620*a-n* and the smart glove computer system 600. It should be appreciated that the communication network 104 may correspond to one or many communication networks without departing from the scope of the present disclosure. The communication network 616 may comprise any type of known communication medium or collection of communication media and may use any type of protocols to transport messages between endpoints. The communication network 616 may include wired and/or wireless communication technologies. The Internet is an example of the communication network 616 that constitutes an Internet Protocol (IP) network consisting of many computers, computing networks, and other communication devices located all over the world, which are connected through many telephone systems and other means. Other examples of the communication network 616 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 616 need not be limited to any one network type, and instead may be comprised of a number of different networks and/or network types. Moreover, the communication network 616 may comprise a number of different communication media such as coaxial cable, copper cable/wire, fiber-optic cable, antennas for transmitting/receiving wireless messages, and combinations thereof.

The first, second, . . . nth computational devices 620*a-n* may correspond to any computational device in the IoT, including, for example, a mobile communication device, such as a smartphone, tablet, laptop, PDA, wearable device, a headset or headphones, a virtual reality headset, and vehicles, home appliances, and other physical devices embedded with electronics, software, sensors, actuators and connectivity enabling the devices to connect, collect and exchange data.

The network communication interface 612 may be provided as a network interface card (NIC), a network port, drivers for the same, and the like. Communications between the components of the system 600 and the computational devices 620*a-n* connected to the communication network 616 may all flow through the first network interface 612.

The processor 624 may correspond to one or many computer processing devices. For instance, the processor 624 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 624 may be provided as a microprocessor, Central Processing Unit (CPU), or plurality of microprocessors that are configured to execute the instructions sets stored in memory 604. Upon executing the instruction sets stored in memory 604, the processor 624 enables display of selected information to the user.

The display 105 provides graphical output of selected information to a user. The display can be any type of computer display, with liquid crystal display or organic light-emitting diode being common. In some configurations, the display comprises a touchscreen layered on the top of a computer display. A user can give input or control the computer system through simple or multi-touch gestures by touching the screen with a special stylus or one or more digits of the user. Any touchscreen technology can be used, including resistive, surface acoustic wave, capacitive (e.g., surface capacitance, projected capacitance, mutual capacitance, and self-capacitance), infrared grid, infrared acrylic projection, optical imaging, dispersive signal technology, and acoustic pulse recognition.

In some embodiments, the sensor input processing instruction set 630, when executed by the processor, causes the processor to apply suitable sensor protocols to convert the sensor input into a uniform format for further processing, the sensor and digit mapping instruction set 634, when executed by the processor, causes the processor to map the unique sensor identifier (e.g., a serial number, electronic address (e.g., a TCP/IP address, MAC address, or other network address), and the like) to a digit of the user, display control instruction set 638, when executed by the processor, causes the processor to map the duration and/or magnitude of each sensor input and corresponding digit location and/or sensor signal sequence and/or signal sensor input frequency to an appropriate command regarding an operation of the display 105 and/or information to be displayed by the display 105, and the communication instruction set 642, when executed by the processor, causes the processor to apply appropriate communication protocols to communications received via the sensor communication interface 608 and network communication interface 612.

Figure 3A:
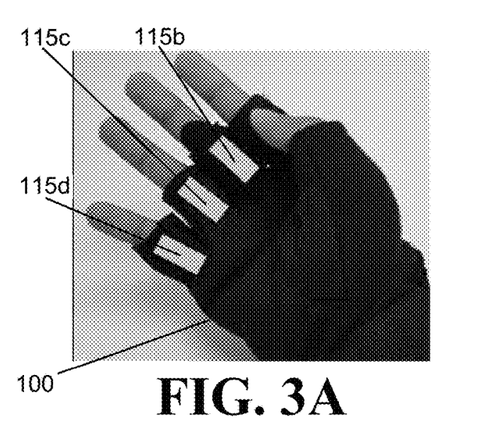
FIGS. 3A, 3B, 3C, and 3D are illustrations of a user using his or her thumb to interact with finger sensors of a smart glove, according to embodiments of the present disclosure.
Figure 3B:
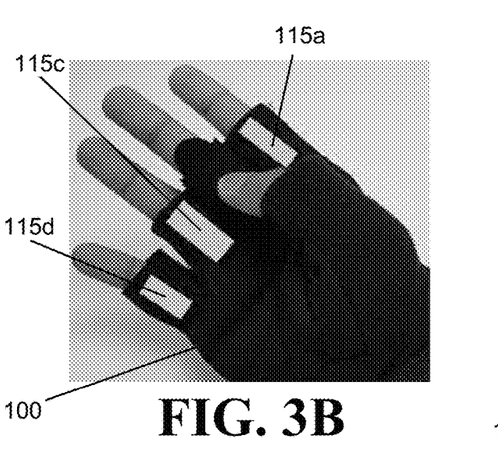
Figure 3C:
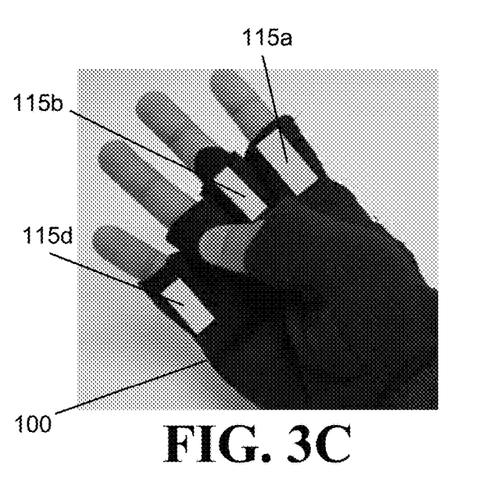
Figure 3D:
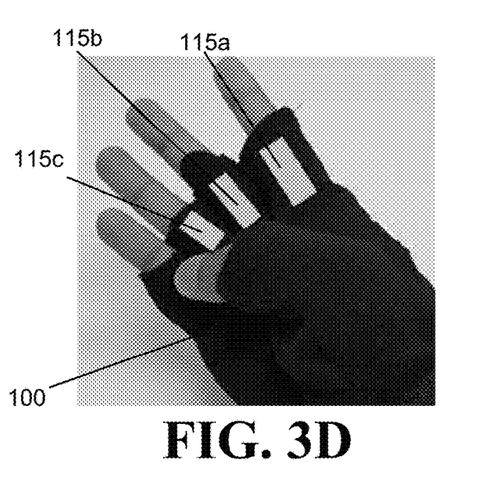

Referring now to FIGS. 3A through 3D, methods by which the user may trigger one or more sensors 115 and thereby control the smart glove 100 while viewing the display are illustrated. This ability can enable the user to perform daily tasks with both hands while providing the user with complete control over accessing the information from the display and interacting with the displayed information from the sensors on each finger with the same hand. In the embodiment of the smart glove 100 illustrated in FIGS. 3A through 3D, the user can easily use his or her thumb to activate (by touch or sensed spatial proximity of the thumb to the sensor) an index finger sensor 115*a* (FIG. 3A), a middle finger sensor 115*b* (FIG. 3B), a ring finger sensor 115*c* (FIG. 3C), and/or a little finger sensor 115*d* (FIG. 3D). Though not illustrated in FIGS. 3A through 3D, a smart glove 100 may comprise additional or alternative sensors on other portions of the glove; by way of non-limiting example, the smart glove 100 may comprise one or more sensors on the palm, which may be triggered by any one or more fingers. In embodiments of the smart glove 100 comprising more than one sensor 115, each sensor 115 may have a different function, which may change depending on an application, configuration, or mode of the smart glove 100. Stated differently, a sensor can have a first function in a first application, configuration, or mode of the smart glove 100 and a different second function in a different second application, configuration, or mode of the smart glove 100. While FIGS. 3A through 3D show interaction of the sensors with the user's thumb, it is to be understood that any finger of either hand of the user can be employed depending on the convenience of the user.

One or more sensor(s) 115 may comprise a feedback mechanism, by which a user may receive feedback when he or she triggers the sensor(s) 115. By way of non-limiting example, the feedback may take the form of an auditory feedback and/or a haptic (i.e. tactile) feedback. It is to be expressly understood that the feedback the user receives upon triggering a sensor 115 may, but need not, be provided at the same location as the sensor 115 that has been triggered; for example, where the user triggers a sensor 115 using his or her thumb, the sensor 115 itself may provide a haptic sensation directly to the user's thumb, and/or the triggered sensor 115 may activate a haptic feedback mechanism elsewhere in the smart glove 100, e.g. at an anterior portion of the user's wrist, to which the sensor 115 is operatively connected.

Figure 4A:
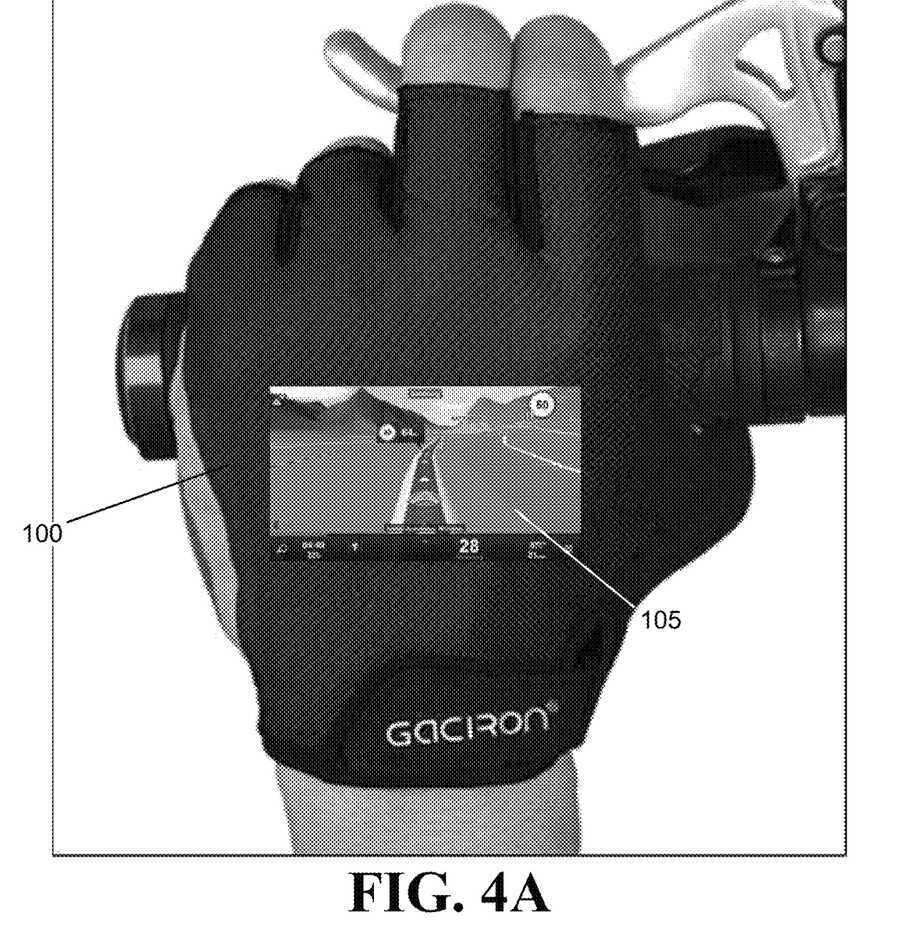
FIGS. 4A, 4B, and 4C are illustrations of GPS, fitness, and other information displayed on a smart glove, according to embodiments of the present disclosure.
Figure 4B:
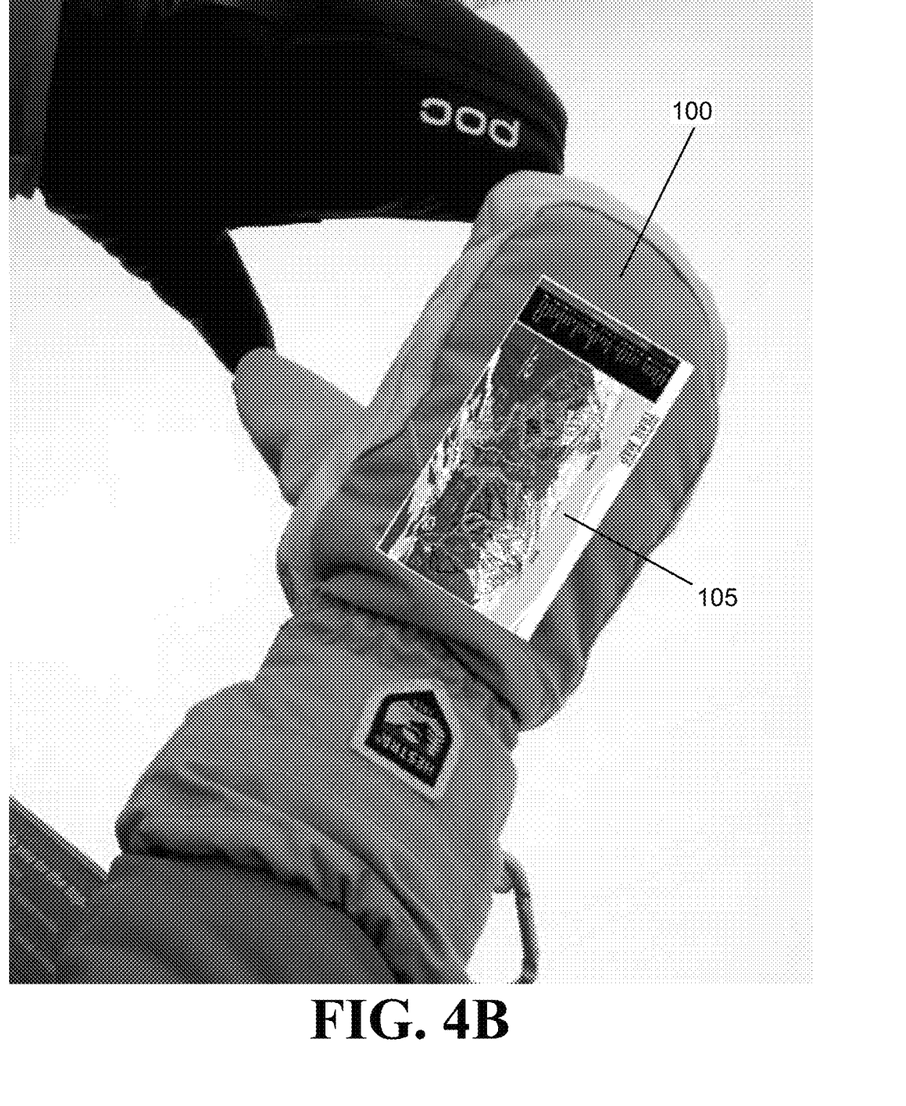
Figure 4C:
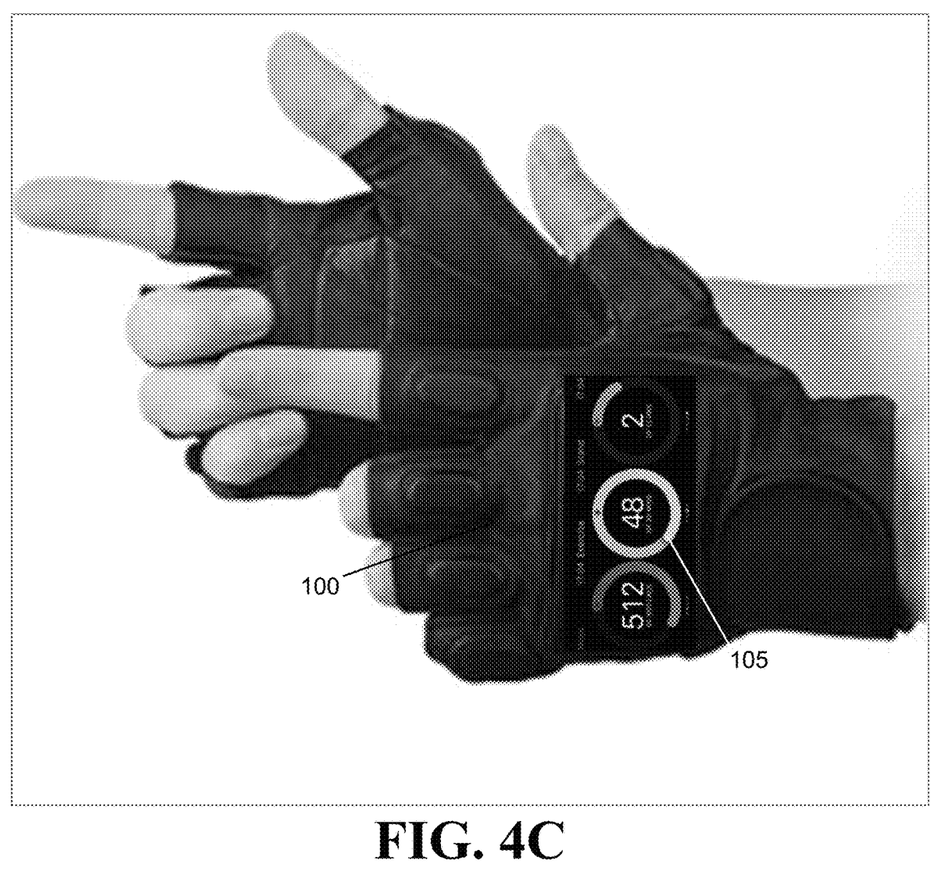

Referring now to FIGS. 4A through 4C, embodiments of the smart glove 100 are illustrated while used to display GPS, fitness, and/or other related information. In FIG. 4A, the user is using the display 105 of the smart glove 100 to show GPS and related navigational information while biking; the user can use sensor(s) 115 disposed on the palmar aspect of the smart glove 100 to control the smart glove 100 in various ways, e.g. zooming the display 105 in or out, planning a new route for navigation, selecting music to be played by a connected device such as headphones, controlling IoT devices, receiving from or providing feedback to another person via the person's connected device, etc. In FIG. 4B, the user is using the display 105 of the smart glove 100 (which in this embodiment takes the form of a mitten) to show terrain maps and related navigational information while skiing; the user can use sensor(s) 115 disposed on the palmar aspect of the smart glove 100 to control the smart glove 100 in various ways, e.g. zooming the display 105 in or out, communicating his or her whereabouts to another wirelessly connected device, etc. In FIG. 4C, the user is using the display 105 of the smart glove 100 to show fitness information while exercising; the user can use sensor(s) 115 disposed on the palmar aspect of the smart glove 100 to control the smart glove 100 in various ways, e.g. scrolling through or displaying new information, changing the settings of a wirelessly connected exercise machine, etc. In these embodiments, the smart glove 100 may be equipped with any of a number of components that aid in functionality, including, by way of non-limiting example, a GPS receiver to provide spatial coordinates providing the user's location, a pedometer to count a user's steps, and/or a heart rate monitor to provide a user's heart rate. These components are in communication with the computer to provide additional sensed information that can be processed and converted into displayed information.

Figure 5A:
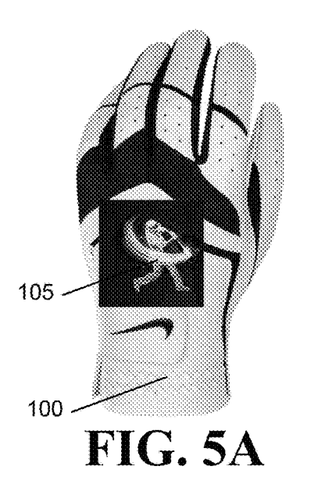
FIGS. 5A, 5B, and 5C are illustrations of sports and other information displayed on a smart glove, according to embodiments of the present disclosure.
Figure 5B:
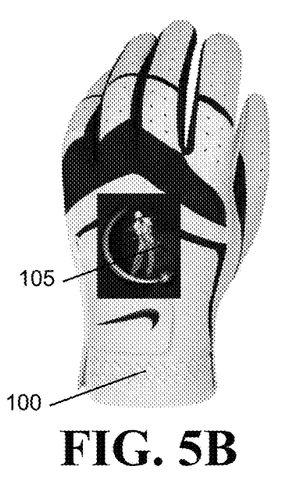
Figure 5C:
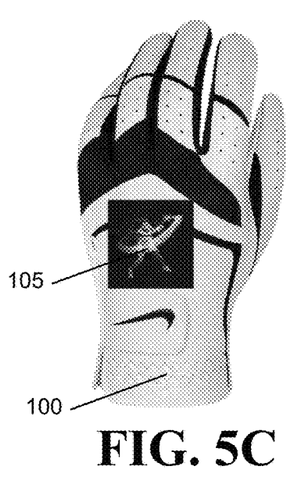

Referring now to FIGS. 5A through 5C, embodiments of the smart glove 100 are illustrated while used to display instructional information, in these cases to aid in developing skills in sports. In FIG. 5A, the smart glove 100 is a batting glove for use in baseball or softball, and the user is using the smart glove 100 to collect (and, via display 105, show) data relating to his or her swing of a bat. In FIG. 5B, the smart glove 100 is a golf glove, and the user is using the smart glove 100 to collect (and, via display 105, show) data relating to his or her swing of a golf club. In FIG. 5C, the smart glove 100 is a practice glove for use in tennis, and the user is using the smart glove 100 to collect (and, via display 105, show) data relating to his or her swing of a tennis racket. In these embodiments, the smart glove 100 may be equipped with any of a number of components that aid in functionality, including, by way of non-limiting example, an accelerometer to measure acceleration of the user's hand, a gyroscope or angular rate sensors or angular velocity sensors to sense angular velocity of the user's hand, and/or communications capabilities (text, phone, video, etc.). These components are in communication with the computer to provide additional sensed information that can be processed and converted into displayed information (e.g., an image of the orientation and/or force of the user's golf, bat, or tennis swing).

In addition to the capabilities illustrated in FIGS. 1 through 5C, the smart glove 100 of the present disclosure may be advantageously employed for various other applications. By way of non-limiting example, the smart glove 100 of the present disclosure may enable the user to select, play, pause, stop, and/or control the volume of music played by a digital music player while biking or driving, without needing to remove his/her hands from the handlebars or steering wheel or take his/her eyes off the road; control Internet of Things (IoT) devices in a home or office environment while simultaneously engaged in tasks that require hand strength or manual dexterity, such as typing, cooking, or tending to children; receive instruction or learning aids when the user is a student, assembly line worker, etc.; receive real-time automated feedback while engaged in musical or sports practices; and so on.

Figure 7:
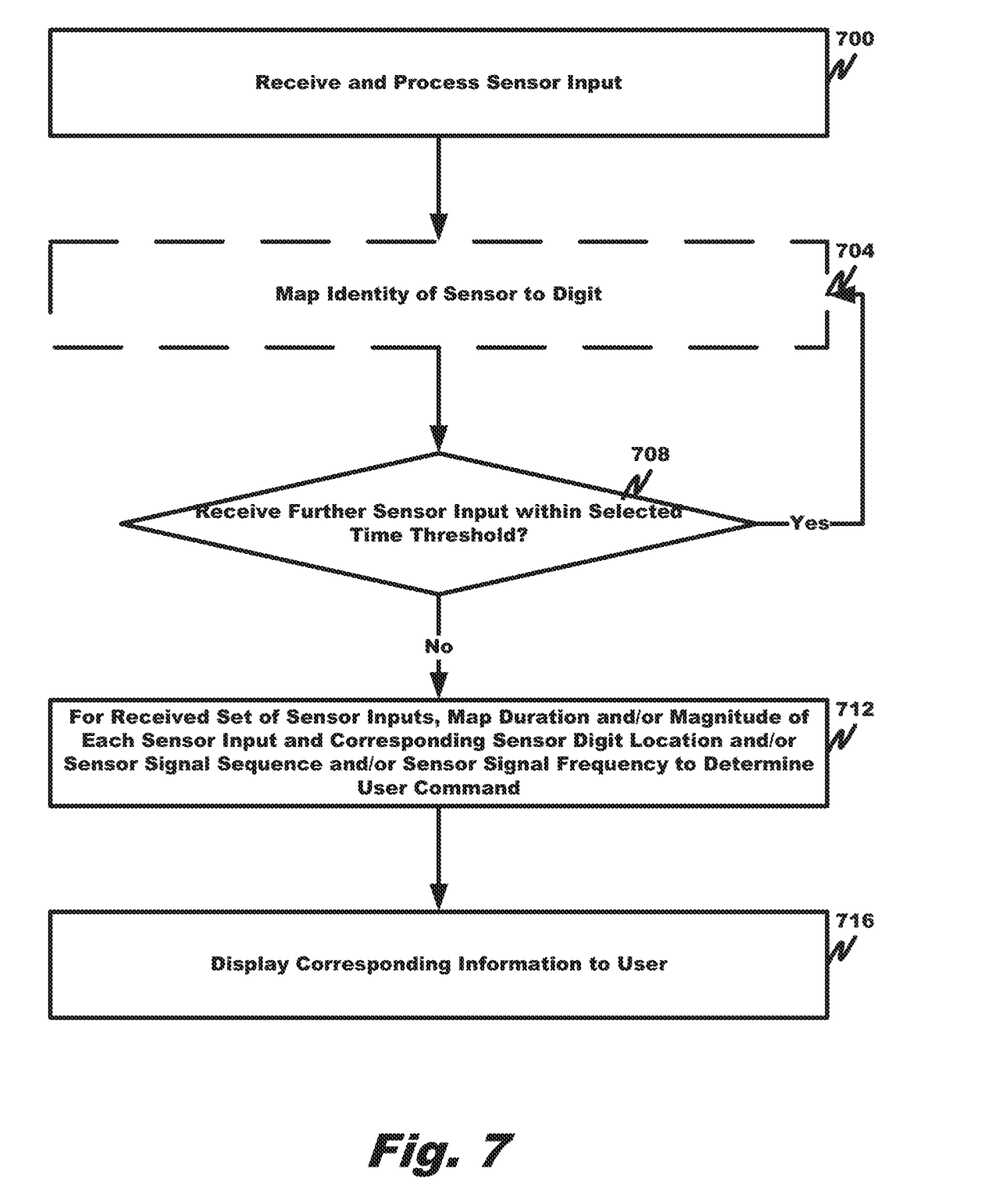
FIG. 7 is a flowchart depicting an operation of the smart glove computer system according to an embodiment of the present disclosure.

FIG. 7 depicts a method of operation of the processor 624 according to an embodiment.

The method begins in step 700 when the sensor communication interface 608 receives and the processor, executes the communication and sensor input processing instruction sets 642 and 630 to process a sensor input from a sensor 115. Typically, the sensor input is from a sensor 115 associated with one of the user's digits. In that event, the sensor input is associated with a command from the user to perform a selected operation, such as change a display setting (e.g., zoom in or zoom out), retrieve and display selected information (such as a map), select a menu option from among multiple menu options, and the like.

The method continues in step 704 by the processor executing sensor and digit mapping instruction set 634 to map the source sensor to a corresponding digit of the user. As will be appreciated, this step is optional. The unique identifier of the sensor can be used in later steps to translate the sensor input into an appropriate user command.

The method continues in step 708 by the processor executing the display control instruction set 638 to determine if the user command is associated with more than one sensor input. This is done by assuming that any sensor inputs temporally proximate to one another (e.g., received by the sensor communication interface within a selected time threshold of one another) is part of a common user command. If the sensor input is associated with (or is related temporally with) another subsequently received sensor input, the processor returns to and executes step 704 with respect to the subsequently received sensor input. If the sensor input is not associated with another subsequently received sensor input (or is not temporally related to a subsequently received sensor input), the display control instruction set 638 causes the processor to proceed to step 712.

In step 712, the processor, executing the display control instruction set 638 for a received set of (temporally related) sensor inputs, maps the duration and/or magnitude of each sensor input in the set of related sensor inputs and corresponding digit location and/or or unique sensor identifier and/or the sensor input sequence and/or sensor input frequency for the sensor inputs (as received by the sensor communication interface) in the set to determine an appropriate user command. In one example, the user's thumb contacts a sensor 115 associated with the user's little finger and no other sensor is contacted as part of the intended user command. The set of sensor inputs has only one member and is mapped to determine the corresponding user command. In another example, the user's thumb contacts a first sensor continuously for a short time period and a second different sensor continuously for a long time period. No other sensor is contacted as part of the intended user command. The set of sensor inputs has two members, each being associated with a different sensor (or different digit of the user) and having a different temporal duration of the sensor input. The processor maps these parameters to determine a corresponding user command. In another example, the user's thumb contacts a first sensor with a light touch and a second different sensor with a heavy touch. No other sensor is contacted as part of the intended user command. The set of sensor inputs has two members, each being associated with a different sensor (or different digit of the user) and having a different magnitude of the sensor input. The processor maps these parameters to determine a corresponding user command. In another example, the user's thumb contacts a first, second, third, and fourth sensor for substantially a common time period and using substantially a common force. The set of sensor inputs has four members, each being associated with a different sensor (or different digit of the user) but having substantially a common sensor input duration and magnitude. The processor maps the sequence of contacting the sensors to determine a corresponding user command. As will be appreciated, two or more of the parameters of sensor input duration, magnitude, and sequence can be combined and mapped to corresponding user commands in other embodiments to meet the requirements of the particular application. In another example, the user's thumb discontinuously contacts the same or different sensor(s) for substantially a common time period and using substantially a common force. The set of sensor inputs has multiple members, with the receipt intervals between times of receipt of temporally adjacent sensor inputs being the same of different. The processor maps the different intervals of contacting the sensors to determine a corresponding user command. As will be appreciated, two or more of the parameters of sensor input duration, magnitude, frequency, and sequence can be combined and mapped to corresponding user commands in other embodiments to meet the requirements of the particular application.

The processor in step 716 executes the determined user command to cause the display to display the corresponding information selected by the user.

In the preceding description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The preceding description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the preceding description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

The term "finger" as used herein refers to any digit of the hand of a human, including but not limited to a thumb, an index finger, a middle finger, a ring finger, and/or a little finger.

The term "geofencing" means the use of GPS or RFID technology to create a virtual geographic boundary, enabling software to trigger a response when a mobile device enters or leaves a particular area.

The term "heel of the hand" as used herein refers to the proximal part of the palm, located anteriorly to the bases of the metacarpal bones.

The term "knuckle" as used herein refers to any joint within or at the base of a finger. As used herein, knuckles are sometimes referred to by an ordinal number, with the number increasing with distance from the palm, e.g. a "first knuckle" is a knuckle at the base of a finger, a "second knuckle" is a midfinger knuckle immediately distal from a first knuckle, a "third knuckle" is a midfinger knuckle immediately distal from a second knuckle, and so on.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

The term "opisthenar" as used herein refers to the central region of the posterior part of the hand of a human, located superficially to the metacarpal bones and opposite the palm. The term "dorsal" as used herein refers to anything of or pertaining to the opisthenar or to the posterior aspect of the hand more generally.

The term "palm" as used herein refers to the central region of the anterior part of the hand of a human, located superficially to the metacarpal bones and opposite the opisthenar area. The terms "palmar" and "volar" as used herein are interchangeable and each refers to anything of or pertaining to the palm or the anterior aspect of the hand more generally.

The term "smart glove" as used herein refers to a wearable computing device adapted to be worn on the hand of a human.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of operation of a wearable computer worn on a hand, comprising:
   a) receiving, by a sensor communication interface of the wearable computer, at least one sensor input from at least one sensor, wherein the at least one sensor is associated with a corresponding finger of a user and disposed on a palmar aspect of the wearable computer and the sensor input is associated with a user command to perform an operation;
   b) executing, by a processor of the wearable computer, at least one of a communication instruction set and a sensor input processing instruction set to process the at least one sensor input;
   c) executing, by the processor, a display control instruction set to determine if the user command is associated with or temporally related to more than one sensor input;
   d) mapping, by the processor, at least one of a duration of each sensor input, a magnitude of each sensor input, a unique sensor identifier, a sensor input sequence, and a sensor input frequency to determine the user command; and
   e) executing, by the processor, the determined user command to cause a display to display information corresponding to the determined user command,
   wherein step b) comprises the sub-step of b1) executing, by the processor, a sensor and finger mapping instruction set to map a source sensor to the corresponding finger of the user,
   wherein, after step c), the processor repeats sub-step b1) with respect to each sensor input if the user command is associated with or temporally related to more than one sensor input and proceeds to step d) if the user command is not associated with or temporally related to more than one sensor input.

2. The method of claim 1, wherein the sensor is at least one of force-sensitive and touch-sensitive.

3. The method of claim 1, wherein the sensor comprises a feedback mechanism, wherein the feedback mechanism provides a perceptible feedback to the user when the sensor communication interface receives the sensor input from the sensor.

4. The method of claim 1, further comprising:
   f) communicating, by the wearable computer and to a device that is in wireless communication with the wearable computer, a device command corresponding to the determined user command.

5. The method of claim 1, wherein the wearable computer comprises at least one additional component selected from the group consisting of a display and a battery.

6. The method of claim 5, wherein the at least one additional component comprises a battery, wherein the battery is disposed on a wrist portion of the wearable computer.

7. The method of claim 1, wherein the wearable computer comprises at least one of a GPS receiver and an accelerometer.

8. A non-transitory computer-readable medium, storing instructions that, when executed by a processor of a wearable computer, cause the processor to perform the steps of:
   a) execute at least one of a communication instruction set and a sensor input processing instruction set to process a sensor input received by a sensor communication interface of the wearable computer from at least one sensor, wherein the sensor input is associated with a user command to perform an operation;
   b) execute a display control instruction set to determine if the user command is associated with or temporally related to more than one sensor input;
   c) map at least one of a duration of each sensor input, a magnitude of each sensor input, a unique sensor identifier, a sensor input sequence, and a sensor input frequency to determine the user command; and
   d) execute the determined user command to cause a display of the wearable computer to display information corresponding to the determined user command,
   wherein step a) comprises the sub-step of a1) executing a sensor and finger mapping instruction set to map a source sensor to a corresponding finger of a user, and
   wherein, after step b), the processor repeats sub-step a1) with respect to each sensor input if the user command is associated with or temporally related to more than one sensor input and proceeds to step c) if the user command is not associated with or temporally related to more than one sensor input.

9. The non-transitory computer-readable medium of claim 8, wherein the instructions, when executed by the processor, cause the processor to further perform the step of providing a perceptible feedback to the user when the sensor communication interface receives the sensor input from the sensor.

10. The non-transitory computer-readable medium of claim 9, wherein the perceptible feedback comprises at least one of an auditory feedback and a haptic feedback.

11. The non-transitory computer-readable medium of claim 8, wherein the instructions, when executed by the processor, cause the processor to further perform the step of communicating, to a device that is in wireless communication with the wearable computer, a device command corresponding to the determined user command.

12. The non-transitory computer-readable medium of claim 11, wherein the device is in Bluetooth communication with the wearable computer.

13. The non-transitory computer-readable medium of claim 11, wherein the device is selected from the group consisting of a speaker, headphones, a smartphone, a smartwatch, a vehicle, and a smart appliance.

14. A wearable computing device adapted to be worn on the hand, comprising:
   a glove;
   a display;
   at least one sensor, adapted to be triggerable by a first finger of the hand and disposed on a palmar aspect of a first portion of the glove, wherein the first portion of the glove is disposed on at least one of a second finger of the hand and a palm of the hand, wherein the first and second fingers of the hand are not the same finger;
   a processor; and
   a computer readable medium storing instructions that, when executed by the processor, cause the processor to perform the steps of:
   a) execute at least one of a communication instruction set and a sensor input processing instruction set to process a sensor input received by the at least one sensor, wherein the sensor input is associated with a user command to perform an operation;
   b) execute a display control instruction set to determine if the user command is associated with or temporally related to more than one sensor input;
   c) map at least one of a duration of each sensor input, a magnitude of each sensor input, a unique sensor identifier, a sensor input sequence, and a sensor input frequency to determine the user command; and
   d) execute the determined user command to cause the display to display information corresponding to the determined user command,
   wherein step a) comprises the sub-step of a1) executing a sensor and finger mapping instruction set to map a source sensor to a corresponding finger of a user, and
   wherein, after step b), the processor repeats sub-step a1) with respect to each sensor input if the user command is associated with or temporally related to more than one sensor input and proceeds to step c) if the user command is not associated with or temporally related to more than one sensor input.

15. The wearable computing device of claim 14, wherein the sensor is at least one of force-sensitive and touch-sensitive.

16. The wearable computing device of claim 14, wherein the sensor comprises a feedback mechanism, wherein the feedback mechanism provides a perceptible feedback to the user when a sensor communication interface receives the sensor input from the sensor.

17. The wearable computing device of claim 14, wherein the instructions, when executed by the processor, cause the processor to further perform the step of communicating, to a device that is in wireless communication with the wearable computing device, a device command corresponding to the determined user command.

18. The wearable computing device of claim 14, further comprising a battery.

19. The wearable computing device of claim 18, wherein the battery is disposed on a wrist portion of the wearable computing device.

20. The wearable computing device of claim 14, further comprising at least one of a GPS receiver and an accelerometer.

* * * * *